United States Patent [19]
Sangret

[11] Patent Number: 5,465,805
[45] Date of Patent: Nov. 14, 1995

[54] POWER STEERING SYSTEM

[75] Inventor: Henry C. Sangret, St. Clair Shores, Mich.

[73] Assignee: TRW Inc., Lyndhurst, Ohio

[21] Appl. No.: 116,378

[22] Filed: Sep. 3, 1993

[51] Int. Cl.$^6$ .................................... B62D 5/06
[52] U.S. Cl. .................................... 180/143; 91/375 A
[58] Field of Search .................................... 180/312, 141,
180/143, 146, 147, 149; 91/375 A, 371, 372, 373

[56] References Cited

U.S. PATENT DOCUMENTS

| | | | |
|---|---|---|---|
| 4,819,545 | 4/1989 | Dymond | 91/375 A X |
| 5,016,723 | 5/1991 | Sano | 180/143 |
| 5,046,573 | 9/1991 | Jones | 180/143 |
| 5,070,957 | 12/1991 | Harkrader et al. | 180/141 |
| 5,190,119 | 3/1993 | Nomura et al. | 180/141 |
| 5,233,906 | 8/1993 | Bishop et al. | 180/143 X |
| 5,291,963 | 3/1994 | Sangret | 91/371 X |
| 5,293,954 | 3/1994 | Dymond | 180/141 |
| 5,297,647 | 3/1994 | Duffy | 180/143 |
| 5,307,895 | 5/1994 | Duffy | 180/143 |

FOREIGN PATENT DOCUMENTS

4138885A1 6/1993 Germany.
2212463 7/1989 United Kingdom.

*Primary Examiner*—Margaret A. Focarino
*Assistant Examiner*—Kevin Hurley
*Attorney, Agent, or Firm*—Tarolli, Sundheim & Covell

[57] ABSTRACT

A vehicle steering system (10, 190, 290) includes inner and outer coaxial valve members (40, 42) which are rotatable relative to each other to port fluid to a vehicle power steering motor (30). A plurality of rocker arms (122, 302) are pivotally connected to the inner valve member (40). Each rocker arm (122, 302) is pivotal relative to the inner valve member (40). Each rocker arm (122, 302) engages a recess (132) in the outer valve member (42). Upon relative rotation between the inner and outer valve members (40, 42), the rocker arms (122, 302) pivot relative to the inner valve member (40). Force is applied to each of the rocker arms (122, 302) to resist pivoting of the rocker arms (122, 302) and relative rotation between the inner and outer valve members (40, 42). In one embodiment, a plurality of pistons (222) are disposed in chambers (220) formed in the outer valve member (42). The pistons (222) are exposed to a fluid pressure which varies as a function of vehicle speed. The pistons (222) are effective to vary the force applied against the rocker arms (122) and the resistance to relative rotation between the valve members (40, 42) as a function of vehicle speed.

39 Claims, 5 Drawing Sheets

POWER STEERING SYSTEM

BACKGROUND OF THE INVENTION

The present invention relates to a control valve for a hydraulic vehicle power steering system, and more specifically to a hydromechanical apparatus for resisting actuation of a power steering control valve.

A known power steering system is disclosed in U.S. Pat. No. 4,819,545. This power steering system includes a control valve assembly having coaxial inner and outer valve members. A plurality of balls are disposed between a cam surface formed on the outer valve member and a cam surface on an annular force transmitting ring which is pressed against the balls by a spring. Under the influence of pressurized hydraulic fluid acting on the force transmitting ring, the balls and cam surfaces cooperate to resist relative rotation between the valve members.

SUMMARY OF THE INVENTION

The present invention provides a new and improved hydraulically assisted power steering system for automotive vehicles. The power steering system includes a manually actuated steering gear including a hydraulic control valve assembly which regulates the flow of pressurized hydraulic fluid from a hydraulic pump to a motor device that effects power to assist an operator in the steering of an automotive vehicle. The control valve assembly includes valve members which are biased to resist rotation relative to each other, but which are rotatable relative to each other to port fluid to the vehicle power steering motor.

A cam, in the form of a rocker arm, is pivotally connected to one of the valve members and includes a portion in contact with the other of the valve members. Upon relative rotation between the valve members, the rocker arm pivots. A force which can be generated by a spring, is applied to one of the valve members and the rocker arm to resist pivoting of the rocker arm and relative rotation between the valve members.

In the invention, the resistance to relative rotation between the valve members changes as the relative angular positions of the inner and outer valve members changes. The rocker arm has cam surfaces with a contour that varies the point of engagement of the rocker arm with a member which resists pivotal movement of the rocker arm.

In operating one embodiment of the invention, a pump supplies fluid to the control valve assembly at a pressure which increases as vehicle speed decreases. The fluid pressure supplied by the pump actuates the power steering motor. The variable fluid pressure supplied by the pump is also used to reduce the resistance to relative rotation and hence actuation of the control valve assembly. The fluid pressure from the pump is conducted to a plurality of piston cheers formed in one of the valve members to reduce the resistance to actuation of the control valve assembly.

In another embodiment of the invention, fluid is conducted to a chamber in which the rocker arm is located. A relief valve controls the pressure in the chamber to create a force, in opposition to the spring, to reduce the resistance to actuation of the control valve assembly.

BRIEF DESCRIPTION OF THE DRAWINGS

The foregoing and other features of the present invention will become more apparent to one skilled in the art upon reading the following description of the present invention with reference to the accompanying drawings, wherein.

DESCRIPTION OF PREFERRED EMBODIMENTS

A vehicle steering system 10 (FIG. 1) is operable to turn steerable vehicle wheels (not shown) upon rotation of a steering wheel 12 by an operator of the vehicle. Rotation of the steering wheel 12 actuates an open center power steering control valve 14 to port fluid from an engine driven pump 18 and supply conduit 20 to either one of a pair of motor conduits 22 and 24. High pressure fluid conducted from the supply conduit 20 through one of the motor conduits 22 or 24 effects operation of a power steering motor 30 to turn the steerable vehicle wheels. Fluid is conducted from the motor 30 to a reservoir 31 through the other one of the motor conduits 22 or 24, the power steering control valve 14, a return conduit 32 and a pressure relief valve 34. A drain conduit 36 conducts fluid from a lower portion of the control valve 14 to the reservoir 31.

Figure 1:
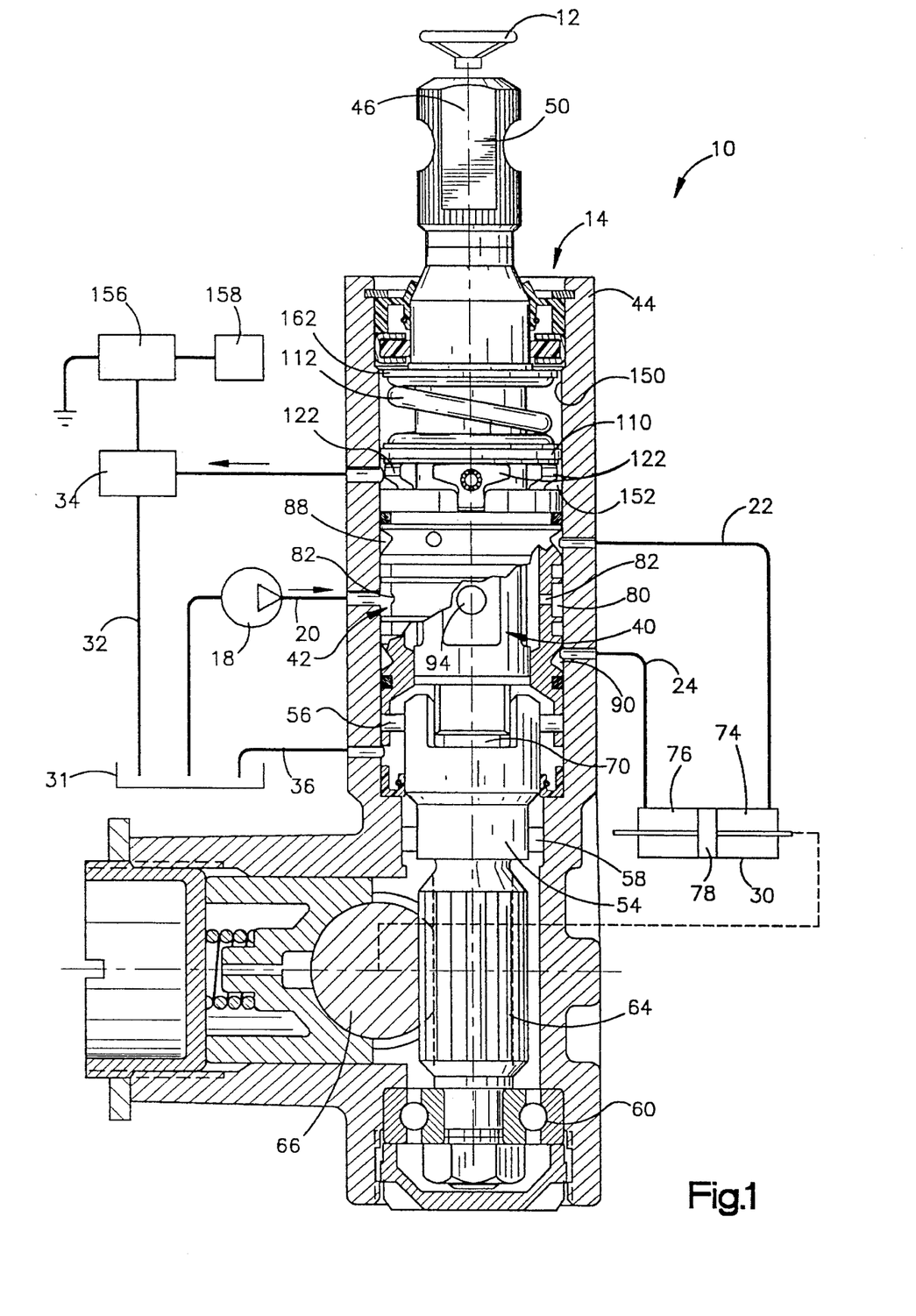
FIG. 1 is a schematic view of a first embodiment of a power steering system and illustrates a power steering control valve in section.

The control valve 14 includes an inner valve member 40 and an outer valve member or sleeve 42. The outer valve member 42 is cylindrical and encloses the inner valve member 40. The inner valve member 40 and the outer valve member 42 are rotatable relative to each other and to a housing 44 about a common central axis 46.

The inner valve member 40 is formed as one piece with a cylindrical input shaft or valve stem 50 which is connected with the steering wheel 12. The outer valve member 42 is connected with an output member 54 by a pin 56. The output member 54 is rotatably supported in the housing 44 by bearings 58 and 60. The output member 54 has a pinion gear portion 64 which is in meshing engagement with the toothed portion of a rack 66. The rack 66 is drivingly connected with the power steering motor 30 and the steerable vehicle wheels in a known manner.

The inner valve member 40 and the outer valve member 42 are drivingly interconnected through a resilient torsion bar spring 70 (which is only partially visible in FIG. 1). One end of the torsion bar 70 is connected to the input shaft 50 and the other end of the torsion bar 70 is connected to the output member 54. The torsion bar 70 deflects (twists) to enable relative rotation between the inner and outer valve members 40 and 42 and when free urges the inner and outer valve members to their initial positions, as is well known in the art.

The control valve 14 is of the open center type. Therefore, when the power steering control valve 14 is in an initial or an unactuated condition, fluid pressure from the pump 18 is conducted through the motor conduits 22 and 24 to motor cylinder chambers 74 and 76 on opposite sides of a piston 78 in the power steering motor 30. Also, fluid flow from the pump 18 is directed by the control valve 14 to the return conduit 32 and reservoir 31.

Upon rotation of the steering wheel 12 and rotation of the input shaft 50, friction between the road and the road engaging wheels resists turning of the vehicle wheels generating a torque in the steering linkage between the ground wheels and the steering wheel. In response to this torque, the inner valve member 40 will be rotated about the axis 46 relative to the outer valve member 42. This relative rotation moves valving edges on the inner valve member 40 relative to valving edges on the outer valve member 42 to direct high pressure fluid from the pump 18 to one of the motor conduits 22 or 24 and directs fluid from the other motor conduit to the reservoir 31.

For example, rotation of the inner valve member 40 in one direction relative to the outer valve member 42 will reduce the extent of communication of the motor conduit 24 with the reservoir 31 and increase the extent of communication of the motor conduit 24 with the pump 18. This results in high pressure fluid from the pump 18 being conducted to the motor cylinder chamber 76. This high pressure fluid moves the piston 78 toward the right (as viewed in FIG. 1). As the piston 78 moves toward the right (as viewed in FIG. 1), fluid discharged from the chamber 74 is conducted through the motor conduit 22 to the reservoir 31 through the return conduit 32 and the control valve 14.

As the power steering motor 30 operates, the rack 66 rotates the pinion 64 and the output member 54. This rotates the outer valve member 42 relative to the inner valve member 40 returning it to a neutral condition. When the power steering motor 30 is operated to turn the steerable vehicle wheels to an extent corresponding to the extent of rotation of the inner valve member 40, the rack 66 rotates the pinion 64 through a distance sufficient to move the outer valve member 42 to its initial position relative to the inner valve member. When this occurs, the fluid pressure in the motor cylinder chambers 74 and 76 equalizes and the motor 30 stops operating.

Pressurized fluid from the pump 18 is conducted to an annular central groove 80 formed in the outer valve member 42. Fluid flows to the inside of the outer valve member 42 through a pair of diametrically opposite passages 82. The inner and outer valve members 40 and 42 may have the same construction and cooperate with each other and the torsion bar 70 in the same manner as described in U.S. Pat. No. 4,276,812, issued Jul. 7, 1981 and entitled "Power Steering Valve and Method of Making Same". However, the inner and outer valve members 40 and 42 could have a different construction if desired.

The inner valve member 40 has a generally square cross sectional configuration with rounded corners which cooperate with axially extending grooves formed inside the outer valve member 42 to control the flow of fluid to and from the motor 30. The ends of one pair of diametrically opposite grooves on the inside of the outer valve member 42 are connected in fluid communication with an annular outer groove 88 connected with the motor conduit 22. A second pair of diametrically opposite axially extending grooves on the inside of the outer valve member 42 are connected in fluid communication with an annular outer groove 90 formed in the outer valve member and connected with the motor conduit 24. A pair of diametrically opposite openings 94 extend radially inwardly to an axially extending central passage in the inner valve member 40. The central passage is connected in fluid communication with the return conduit 32.

An annular force transmitting member or piston 110 is disposed in the power steering control valve housing 44 and is axially movable relative to the inner and outer valve members 40 and 42. The annular piston 110 circumscribes and is connected to the inner valve member 40 for rotation therewith. However, the piston 110 is axially movable relative to the inner valve member 40. The piston 110 is urged axially toward the cylindrical outer valve member 42 by a coil spring 112 which also circumscribes the inner valve member 40 and rotates with the inner valve member.

The downward force applied against the piston 110 by the coil spring 112 presses an annular lower surface 114 (FIG. 2) of the piston against the upper surfaces 120 of a plurality of rocker arms 122. The rocker arms 122 are pivotally connected to the inner valve member 40. Preferably there are three rocker arms 122 equally spaced about the inner valve member 40.

Each rocker arm 122 (FIG. 2) is pivotally connected to the inner valve member 40 and the input shaft 50 by a radial pin 124 extending through a central portion 125 of the rocker arm. Bearings 126 support the rocker arm 122 for pivotal movement about the pin 124. The rocker arm 122 is pivotal about a radial axis 128 of the inner valve member 40. The axis 128 about which the rocker arm 122 pivots extends through and is perpendicular to the axis 46 of the inner and outer valve members 40 and 42.

Each rocker arm 122 has a generally T-shaped configuration. Thus, each rocker arm 122 includes a lower portion 130 which extends parallel to the axis 46 of the inner and outer valve members 40 and 42 when the rocker arm is in the initial position of FIG. 2. The lower portion 130 of the rocker arm 122 extends into a recess 132 in an upper end portion of the outer valve member 42. The portion 130 of the rocker arm 122 engages surfaces 134 which define the recess 132 in the outer valve member 42.

The rocker arm 122 includes a pair of side portions 140 and 142 which extend perpendicular to the lower portion 130. The side portions 140 and 142 extend from opposite sides of the central portion 125 so that the rocker arm 122 is generally T-shaped. The side portions 140 and 142 of the rocker arm 122 engage the piston 110 when the rocker arm is in the initial position of FIG. 2.

Upon rotation of the inner valve member 40 relative to the outer valve member 42, the axes about which the rocker arms 122 pivot move relative to the outer valve member. As this occurs, the surfaces 134 of the recesses 132 in the outer valve member 42 apply force against the lower portions 130 of the rocker arms 122. This force pivots the rocker arms 122 about the pins 124. Pivotal movement of the rocker arms about the pins 124 moves a side portion 140 or 142 of each of the rocker arms upwardly (as viewed in FIGS. 1 and 2) against the piston 110. The upward force applied by the rocker arms 122 against the piston 110 moves the piston upwardly and compresses the spring 112.

The spring 112 urges the piston 110 downwardly (as viewed in FIG. 1) to apply force against the side portions 140 or 142 (FIG. 2) of the rocker arms 122 as the rocker arms are pivoted by rotation of the inner valve member 40 relative to the outer valve member 42. The force applied against the side portions 140 or 142 of the rocker arms 122 by the piston 110 and spring 112 resists pivoting movement of the rocker arms. By resisting pivoting movement of the rocker arms 122, the piston 110 and spring 112 resist relative rotation between the inner and outer valve members 40 and 42.

Figure 3:
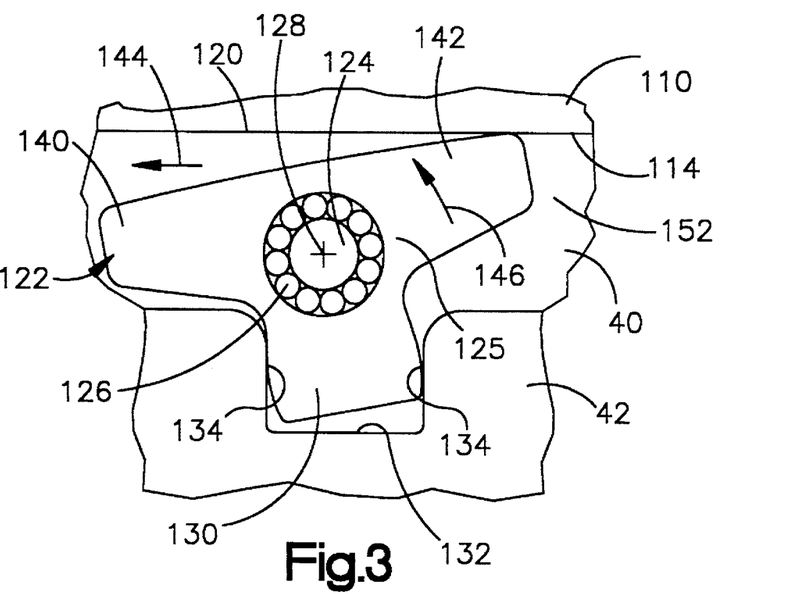
FIG. 3 is a view, similar to FIG. 2, illustrating the relationship between the inner and outer valve members and rocker arm upon relative rotation between the valve members.

Upon rotation of the inner valve member 40 in the direction of the arrow 144 (FIG. 3) relative to the outer valve member 42, the axis 128 about which the rocker arm 122 pivots moves toward the left (as viewed in FIG. 3). This causes the left side surface 134 of the recess 132 in the outer valve member 42 to apply force against the lower portion 130 of the rocker arm 122. The force applied against the lower portion 130 of the rocker arm 122 by the outer valve member 42 pivots the rocker arm in a counterclockwise direction, indicated by the arrow 146 in FIG. 3, about the pin 124. As the rocker arm 122 pivots in a counterclockwise direction (FIG. 3), the side portion 140 of the rocker arm moves away from the piston 110 and the side portion 142 of the rocker arm forces the piston upwardly against the force of the spring 112.

In accordance with one of the features of the first embodiment of the present invention, the torque required to actuate the power steering control valve 14 is decreased as the vehicle speed decreases. Thus, at low vehicle speeds and when the vehicle is stationary, a relatively small torque is required to rotate the inner valve member 40 relative to the outer valve member 42. At higher vehicle speeds, a larger torque is required to rotate the inner valve member 40 relative to the outer valve member 42.

The piston 110 (FIG. 1) cooperates with a cylindrical inner side surface 150 of the housing 44 and the input shaft 50 to form an annular fluid pressure chamber 152 on an axially opposite side of the piston 110 from the spring 112. The rocker arms 122 are located in the fluid pressure chamber 152. The fluid pressure chamber 152 is in fluid communication with the axially extending central passage in the inner valve member 40 and with the reservoir 31. The fluid pressure in the chamber 152 urges the piston 110 away from the rocker arms 122 in opposition to the spring 112.

Rotation of the input shaft 50 and the inner valve member 40 relative to the housing 44 and the outer valve member 42 is resisted by a torque which is a function of the difference between the fluid pressure force applied to the piston 110 and the spring force applied to the piston. As the input shaft 50 is rotated from the initial position, the surfaces 134 of the recess 132 in the outer valve member 42 engage the rocker arms 122 to pivot the rocker arms relative to the inner valve member 40. As this occurs, the portions 142 of the rocker arms 122 engage the piston 110 (FIG. 3) and move the piston against the influence of the spring 112.

The torque required to pivot the rocker arms 122 and move the piston 110 away from the outer valve member 42 varies as a function of the net force urging the piston 110 toward the outer valve member 42. Thus, the greater the net force pressing the piston 110 against the rocker arms 122, the greater is the force required to rotate the input shaft 50 and the inner valve member 40 relative to the output member 54 and the outer valve member 42. The net force pressing the piston 110 against the rocker arms 122 is equal to the difference between the force applied by the spring 112 and the fluid pressure force applied by the fluid in chamber 152. The greater the fluid pressure force applied to the piston 110, the smaller is the force which must be overcome to rotate the inner valve member 40 relative to the outer valve member 42.

The pressure relief valve 34 (FIG. 1) controls the pressure in the chamber 152. An electronic control unit or ECU 156 receives a signal from a speed sensor 158 to control the pressure relief valve 34. As the vehicle speed decreases, the ECU 156 controls the pressure relief valve 34 to reduce the amount of fluid flowing from the chamber 152 to the reservoir 31 and increase the fluid pressure in chamber 152. As the vehicle speed decreases, the force urging the piston 110 toward the rocker arms 122 is decreased to reduce the amount of force applied to the rocker arms that resists pivoting of the rocker arms. Thus, as vehicle speed decreases, the resistance to relative rotation between the inner valve member 40 and the outer valve member 42 is also decreased. The electronic control unit 156 and pressure relief valve 34 may have the same construction and mode of operation as the speed responsive control unit disclosed in U.S. Pat. No. 4,819,545.

Upon rotation of the steering wheel 12 and the inner valve member 40, the rocker arms 122 exert a force on the piston 110. This force is added to the fluid pressure force in the chamber 152 to move the piston 110 away from the outer valve member 42. As this occurs, the spring 112 is compressed against a collar 162 which is held against axial movement relative to the valve stem 50.

Figure 2:
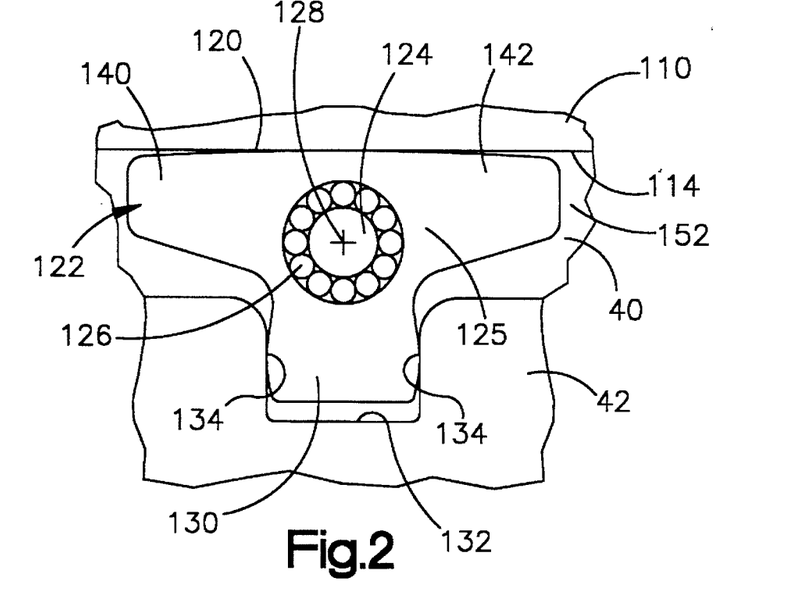
FIG. 2 is a fragmentary view of a portion of FIG. 1, on an enlarged scale, illustrating the relationship between inner and outer valve members and a rocker arm when the valve members are in an unactuated condition.
Figure 4:
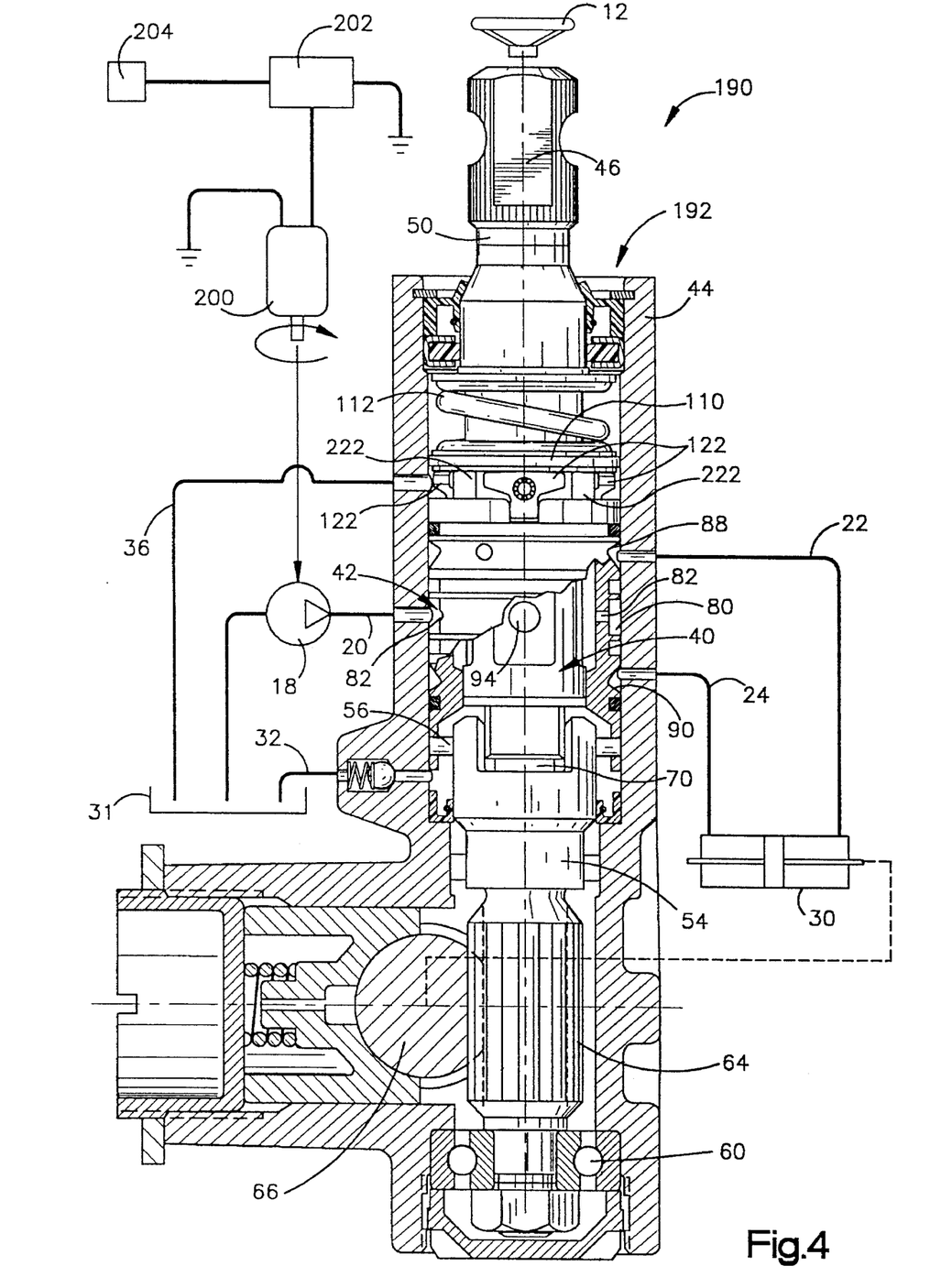
FIG. 4 is a schematic view, generally similar to FIG. 1, of a second embodiment of a power steering system and illustrates a second power steering control valve in section.
Figure 5:
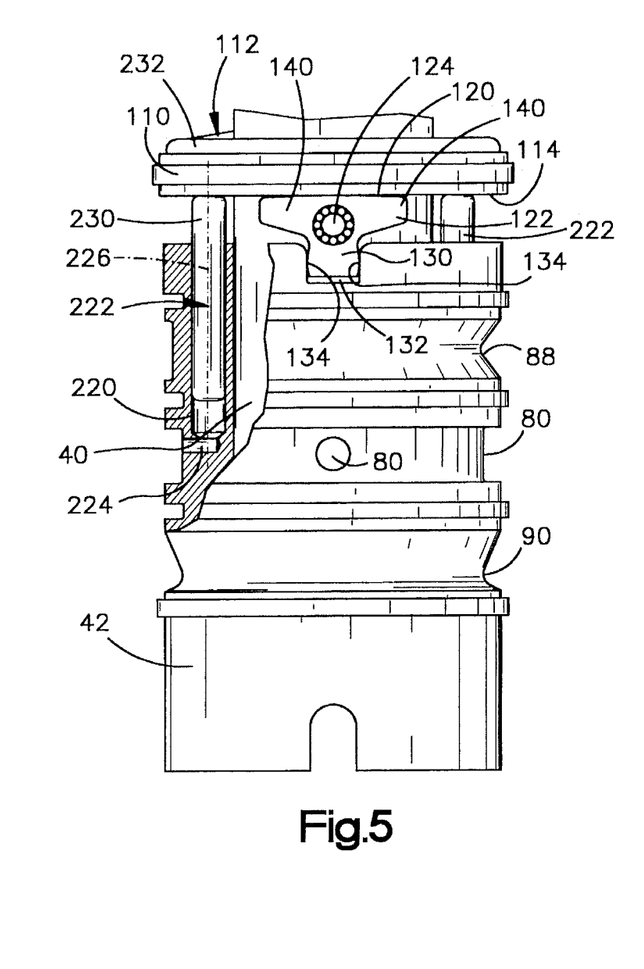
FIG. 5 is a broken away view of a portion of FIG. 4 on an enlarged scale.
Figure 6:
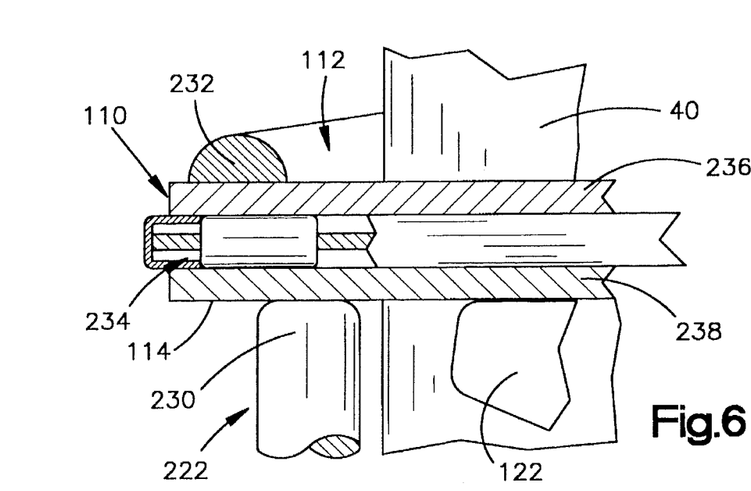
FIG. 6 is an enlarged fragmentary sectional view of a portion of FIG. 4.

In the embodiment of the invention illustrated in FIGS. 1 and 2, fluid pressure in the chamber 152 decreases the resistance provided by the rocker arms 122 to relative rotation between the inner and outer valve members 40 and 42. In the embodiment of the invention illustrated in FIGS. 4, 5 and 6, fluid pressure in a plurality of piston chambers decreases the resistance provided by rocker arms to relative rotation between inner and outer valve members. Since the embodiment of the invention illustrated in FIGS. 4, 5 and 6 is generally similar to the embodiment of the invention illustrated in FIGS. 1 and 2, similar numerals will be utilized to designate similar components.

A vehicle power steering system 190 (FIG. 4) is operable to turn steerable ground engaging vehicle wheels (not shown) upon rotation of a steering wheel 12 by an operator of the vehicle. Rotation of the steering wheel 12 actuates an open center power steering control valve 192 to port fluid from a pump 18 and supply conduit 20 to either one of a pair of motor conduits 22 and 24 when the speed of the vehicle is below a predetermined value. Preferably, the pump 18 is driven by an electric motor 200 although it is possible to use a similar pump driven by the engine and controlled by appropriate flow and pressure controls.

The speed at which the pump 18 is driven by the electric motor 200, and hence the flow of the pump, is determined by an electronic control unit or ECU 202. The ECU 202 receives a signal from a vehicle speed sensor 204. The ECU 202 turns on the electric motor 200 to drive the pump 18 when the speed of the vehicle is below a predetermined speed. The ECU 202 turns the motor 200 off when the speed of the vehicle exceeds the predetermined higher speed. As the vehicle speed changes from low to the predetermined vehicle speed, the motor 200 reduces the speed of the pump 18, and hence the flow from the pump.

When the vehicle speed is below the predetermined speed, the ECU 202 effects operation of the motor 200 to drive the pump 18 at a speed which increases as vehicle speed decreases. Thus, when the vehicle is stationary or moving very slowly, the motor 200 drives the pump 18 at a relatively high speed to supply a larger flow of fluid to the control valve 192. As the speed of the vehicle increases, the speed at which the motor 200 drives the pump 18 decreases and the fluid flow supplied to the control valve 192 and the steering motor decreases. In the illustrated embodiment of the invention, the ECU 202 causes the speed at which the motor 200 drives the pump 18 to vary as an inverse linear function of vehicle speed until the predetermined vehicle speed is reached. When the predetermined vehicle speed is obtained, operation of the pump 18 is interrupted and no hydraulic assist is provided for steering.

Fluid under pressure is conducted from the supply conduit 20 through the control valve 192 to one of the motor conduits 22 or 24 and effects operation of a power steering motor 30 to turn the steerable vehicle wheels at vehicle speeds less than the predetermined speed. Fluid is conducted from the motor 30 to a reservoir 31 through the other one of the motor conduits 22 or 24 and return conduit 32. A drain conduit 36 conducts fluid from an upper portion of the control valve 192 to the reservoir 31.

At vehicle speeds above the predetermined vehicle speed, the motor 200 is deenergized and the pump 18 does not operate. When the pump is off the steerable vehicle wheels are turned under the influence of manual force transmitted from the steering wheel 12 through the control valve 192 to the pinion gear 64. The control valve 192 is of the open center type so that fluid can flow through the control valve between opposite chambers of the power steering motor 30 as the steerable vehicle wheels are turned manually.

The control valve 192 includes an inner valve member 40 and an outer valve member 42. The outer valve member 42 is cylindrical and encloses the inner valve member 40. The inner valve member 40 and the outer valve member 42 are rotatable relative to each other and to a housing 44 about a common central axis 46.

The inner valve member 40 and the outer valve member 42 are drivingly interconnected through a resilient torsion bar spring 70 (which is only partially visible in FIG. 4). One end of the torsion bar 70 is connected to an input shaft 50 formed as one piece with the inner valve member 40. The other end of the torsion bar is connected to an output member 54. The output member 54 is connected to the outer valve member 42 by a pin 56. The torsion bar 70 deflects to enable relative rotation to occur between the inner and outer valve members 40 and 42, and urges the inner and outer valve members to their initial position, as is well known in the art.

Upon rotation of the steering wheel 12 and rotation of the input shaft 50, the inner valve member 40 will be rotated about the axis 46 relative to the outer valve member 42. This relative rotation moves valving edges on the inner valve member 40 relative to valving edges on the outer valve member 42 to direct pressurized fluid from the pump 18 to one of the motor conduits 22 or 24 when the speed of the vehicle is below the predetermined speed. The relative rotation between the inner and outer valve members 40 and 42 also directs fluid from the other motor conduit to the reservoir 31.

Pressurized fluid from the pump 18 is conducted to an annular central groove 80 formed in the outer valve member 42 when the speed of the vehicle is below the predetermined speed. Fluid flows to the inside of the outer valve member 42 through a pair of diametrically opposite passages 82. The inner and outer valve members 40 and 42 may have the same construction and cooperate with each other when the speed of the vehicle is below the predetermined speed in the same manner as described in connection with the embodiment of FIG. 1. However, the inner and outer valve members 40 and 42 could have a different construction if desired.

A piston 110 is disposed in the power steering control valve housing 44 and is axially movable relative to the inner and outer valve members 40 and 42. The piston 110 is urged axially toward the outer valve member 42 by a coil spring 112 which is disposed in coaxial relationship with and circumscribes the input shaft 50. The force applied against the piston 110 by the coil spring 112 presses a lower surface 114 (FIG. 5) of the piston 110 against the upper surfaces 120 of a plurality of rocker arms 122.

The rocker arms 122 are pivotally connected to the inner valve member 40. Preferably there are three rocker arms 122 equally spaced about the inner valve member 40. The rocker arms 122 cooperate with the inner and outer valve members 40 and 42 and the piston 110 and spring 112 to resist relative rotation between the inner and outer valve members in the same manner as previously described in conjunction with the embodiment of the invention illustrated in FIGS. 1–3.

The outer valve member 42 includes a plurality of, preferably three, axially extending cylindrical chambers 220, one of which is shown in FIG. 5. Located within each of the chambers 220 is an axially extending cylindrical piston 222 engageable with the surface 114 of the piston 110. The piston chambers 220 and pistons 222 have coincident central axes 226 which are parallel to the central axis 46 of the control valve 192. Each of the axially extending chambers 220 is connected in fluid communication with the pump 18 by a radially extending passage 224 (FIG. 5) and the annular outer groove 82 in the outer valve member 42.

Upper end portions 230 of the pistons 222 and a lower end portion 232 of the spring 112 engage opposite sides of piston 110. The spring 112 rotates with the inner valve member 40. The pistons 222 rotate with the outer valve member 42. Although it is preferred to locate the pistons 222 and piston chambers 220 in the outer valve member 42, the pistons and piston chambers could be disposed at other locations in the control valve 192 if desired.

To accommodate relative rotation between the inner and outer valve members 40 and 42, the piston 110 includes an annular thrust bearing assembly 234 (FIG. 6). The thrust bearing assembly 234 is located between flat annular upper and lower thrust plates 236 and 238. The upper thrust plate 236 is engaged by the lower end portion 232 of the spring 112 and rotates with the inner valve member 40. The lower thrust plate 238 is engaged by the pistons 222.

Once the speed of the vehicle has decreased to a speed which is less than the predetermined speed, the ECU 202 causes the motor 200 to drive the pump 18 at a speed which increases as vehicle speed decreases. Therefore, the fluid flow conducted from the pump 18 to the power steering motor 30 and the piston chambers 220 increases as vehicle speed decreases.

When the speed of the vehicle is below the predetermined speed, the ECU 202 turns the motor 200 on to operate the pump 18. The pump 18 supplies pressurized fluid to the passages 224 (FIG. 5) and axially extending chambers 220 in the outer valve member 42. The fluid pressure in the chambers 220 urges the pistons 222 upwardly into engagement with the piston 110. As the speed of the vehicle decreases from the predetermined speed, the fluid flow from the pump 18 increases to increase the fluid pressure in chambers 220. The pump 18 also supplies pressurized fluid to the power steering motor 30 through the control valve 192.

When the speed of the vehicle is substantially low, the fluid pressure in the chambers 220 causes the pistons 222 to move the piston 110 axially upwardly (as viewed in FIG. 5) and out of engagement with the rocker arms 122. When the inner valve member 40 is rotated relative to the outer valve member 42, the rocker arms 122 pivot but do not engage the piston 110. The only resistance to initial relative rotation between the inner and outer valve members 40 and 42 is due to the torsion bar 70. Therefore, when the speed of the vehicle is substantially low, the resistance to relative rotation between the inner and outer valve members 40 and 42 is at a minimum.

When the speed of the vehicle is above the substantially low speed and below the predetermined speed when the pump 18 ceases to operate and there is relative rotation between the inner and outer valve members 40 and 42, the rocker arms 122 pivot into engagement with the piston 110. The force applied against the rocker arms 122 by the piston 110 again assists the torsion bar 70 in resisting relative rotation between the valve members. As the speed of the vehicle increases from the substantially low speed to the predetermined speed, the fluid pressure in chambers 220 decreases. The force which the pistons 222 apply to the piston 110 decreases to increase the resistance to relative rotation between the inner and outer valve members 40 and 42.

When the speed of the vehicle exceeds the predetermined speed, the ECU 202 turns the motor 200 off and the pump 18 does not supply the control valve 192 with high pressure fluid. There is no fluid pressure in the chambers 220 to force the pistons 222 into engagement with the piston 110. As the input shaft 50 is rotated from the initial position, the surfaces 134 of the recesses 132 of the rocker arms 122 engage the piston 110 and move the piston against the influence of the spring 112. The torque required to pivot the rocker arms 122 and move the piston 110 away from the outer valve member 42 resists the relative rotation between the inner and outer valve members 40 and 42.

When the ECU 202 turns the motor 200 off and the pump 18 does not supply the control valve 192 with fluid pressure, the power steering motor 30 is ineffective to assist in turning the steerable vehicle wheels. At this time, manual force which is applied to the steering wheel 12 is effective to turn the steerable vehicle wheels. This manual force is transmitted through the torsion bar 70 and rocker arms 122.

In the embodiment of the invention illustrated in FIGS. 1, 2 and 3, the torque applied to the rocker arms 122 to resist pivoting of the rocker arms is controlled by the speed of the vehicle. In the embodiment of the invention illustrated in FIGS. 7 and 8, the torque applied to the rocker arms 122 varies as the relative angular positions of the inner and outer valve members 40 and 42 change. Since the embodiment of the invention illustrated in FIGS. 7 and 8 is generally similar to the embodiment of the invention illustrated in FIGS. 1, 2 and 3, similar numerals will be utilized to designate similar components.

A vehicle power steering system 290 (FIG. 7) is operable to turn steerable vehicle wheels (not shown) upon rotation of a steering wheel 12 by an operator of the vehicle. Rotation of the steering wheel 12 actuates an open center power steering control valve 292 to port fluid from an engine driven pump 18 and supply conduit 20 to either one of a pair of motor conduits 22 and 24. Pressurized fluid conducted from the supply conduit 20 through one of the motor conduits 22 or 24 effects operation of a power steering motor 30 to turn the steerable vehicle wheels. Fluid is conducted from the motor 30 to a reservoir 31 through the other one of the motor conduits 22 or 24, the power steering control valve 292, and a return conduit 32. A drain conduit 36 conducts fluid from the upper portion of the control valve 292 to the reservoir 31.

The control valve 292 includes an inner valve member 40 and an outer valve member or sleeve 42. The outer valve member 42 is cylindrical and encloses the inner valve member 40. The inner valve member 40 and the outer valve member 42 are rotatable relative to each other and to a housing 44 about a common central axis 46.

Figure 7:
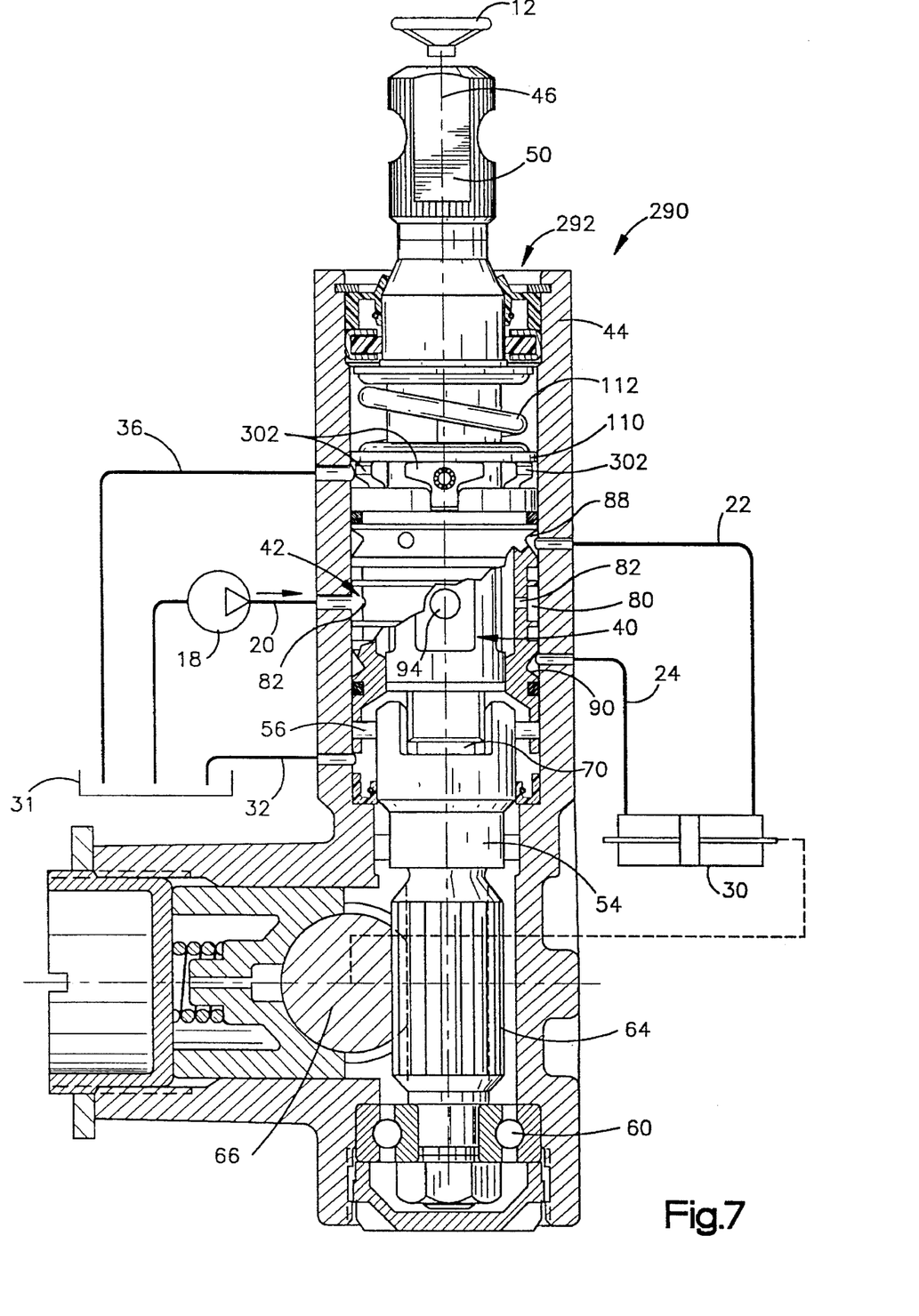
FIG. 7 is a schematic view, generally similar to FIG. 1, of a third embodiment of a power steering system and illustrates a third power steering control valve in section.
Figure 8:
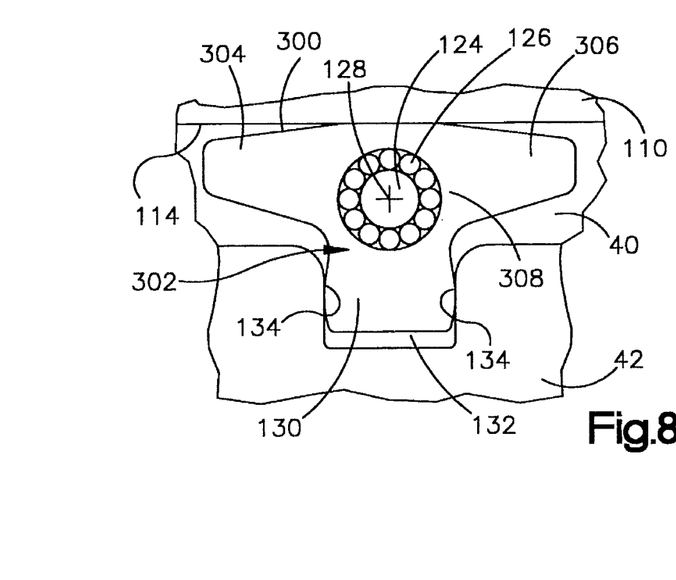
FIG. 8 is a view of a portion of FIG. 7, on an enlarged scale, illustrating a second embodiment of the rocker arm.

The inner valve member 40 and the outer valve member 42 are drivingly interconnected through a resilient torsion bar spring 70 (which is only partially visible in FIG. 7). One end of the torsion bar 70 is connected to an input shaft 50 formed as one piece with the inner valve member 40. The other end of the torsion bar is connected to an output member 54 connected to the outer valve member 42. The torsion bar 70 twists to enable relative rotation between the inner and outer valve members 40 and 42 and when free urges the inner and outer valve members to their initial positions, as is well known in the art.

Upon rotation of the steering wheel 12 and rotation of the input shaft 50, the inner valve member 40 will be rotated about the axis 46 relative to the outer valve member 42. This relative rotation moves valving edges on the inner valve member 40 relative to valving edges on the outer valve member 42 to direct pressurized fluid from the pump 18 to one of the motor conduits 22 or 24 and direct fluid from the other motor conduit to the reservoir 31.

Pressurized fluid from the pump 18 is conducted to an annular central groove 80 formed in the outer valve member 42. Fluid flows to the inside of the outer valve member 42 through a pair of diametrically opposite openings 82. The inner and outer valve members 40 and 42 may have the same construction and cooperate with each other as described in connection with the embodiment of FIG. 1. However, the inner and outer valve members 40 and 42 could have a different construction.

A piston 110 is urged axially toward the outer valve member 42 by a coil spring 112 which is disposed in coaxial relationship with and circumscribes the input shaft 50. The downward force applied against the piston 110 by the coil spring 112 presses the lower surface 114 (FIG. 8) of the piston 112 against upper surfaces 300 of a plurality of rocker arms 302 pivotally connected to the inner valve member 40. Preferably there are three rocker arms 302 equally spaced about the inner valve member 40.

Each rocker arm 302 (FIG. 8) is pivotally connected to the inner valve member 40 and the input shaft 50 by a pin 124. Bearings 126 support the rocker arm 302 for pivotal movement about the pin 124 and an axis 128 extending transverse to the axis 46 of the inner and outer valve members 40 and 42. Each rocker arm 302 includes a lower portion 130 extending parallel to the axis 46 of the first and second valve members 40 and 42 and into a recess 132 in the outer valve member 42. The lower portion 130 of the rocker arm 302 engages surfaces 134 which define the recess 132 of the outer valve member 42.

The rocker arm 302 includes a pair of side portions 304 and 306 which extend perpendicular to the portion 130. The portions 304 and 306 extend from opposite sides of a central portion 308 so that the rocker arm 302 is T-shaped. Upon relative rotation between the inner and outer valve members 40 and 42, the rocker arms 302 pivot about the pins 124. One of the side portions 304 or 306 engages the piston 110 to move the piston axially away from the outer valve member 42 against the force of the spring 112. The spring 112 and piston 100 apply a torque to the rocker arms 302 to resist pivoting of the rocker arms and resist relative rotation between the inner and outer valve members 40 and 42.

Each of the surfaces 300 of the rocker arms 302 is contoured. The contour of the surface 300 causes the point of engagement of the piston 110 with the rocker arm 302 to vary along the surface 300 as the relative angular positions of the inner and outer valve members 40 and 42 change. Varying the point of contact between the piston 110 and the rocker arm 302 varies the torque applied to the rocker arm by the piston. While the force applied to the rocker arm 302 by the piston 110 does not change, the length of the moment arm of the force applied to the rocker arm changes. Thus, the torque applied to the rocker arm 302 varies depending on the relative angular positions of the inner and outer valve members 40 and 42.

Upon rotation of the input shaft 50 and the inner valve member 40 relative to the outer valve member 42, the rocker arms 302 pivot relative to the inner valve member. The amount of pivotal movement of the rocker arms 302 depends on the relative rotation between the inner and outer valve members 40 and 42. The points of contact of the piston 110 with the rocker arms 302 and therefore, the length of the moment arms of the forces applied to the rocker arms depends on the amount of pivotal movement of the rocker arms relative to the inner valve member 40. Thus, the resistance to relative rotation between the inner and outer valve members 40 and 42 due to the piston 110, the spring 112, and the rocker arms 302 varies as the relative angular positions of the inner and outer valve members change.

From the above description of the invention, those skilled in the art will perceive improvements, changes and modifications. Such improvements, changes and modifications within the skill of the art are intended to be covered by the appended claims.

Having described the invention, the following is claimed:

1. A steering system for a vehicle, said steering system comprising:

first and second valve members which are rotatable relative to each other to port fluid to a vehicle power steering motor;

a rocker arm pivotally connected to said first valve member, said rocker arm being pivotal relative to said first valve member by said second valve member upon relative rotation between said first and second valve members; and means for applying force to said rocker arm to resist pivoting of said rocker arm relative to said first valve member by said second valve member to thereby resist relative rotation between said first and second valve members.

2. A steering system as defined in claim 1 further including means for varying the resistance to pivoting movement of said rocker arm relative to said first valve member.

3. A steering system as defined in claim 1 wherein said means for applying force to said rocker arm includes a force transmitting member engageable with said rocker arm and movable relative to said rocker arm in a direction transverse to a pivot axis of said rocker arm and means for urging said force transmitting member toward said rocker arm.

4. A steering system as defined in claim 3 wherein said means for urging said force transmitting toward said rocker arm includes a spring.

5. A steering system as defined in claim 1 wherein said first and second valve members are substantially cylindrical, said second valve member encloses said first valve member.

6. A steering system as defined in claim 1 wherein said second valve member has surface means defining a recess, said rocker arm having a portion extending into the recess and engaging said surface means to enable force to be transmitted between said second valve member and said rocker arm upon relative rotation between said first and second valve members.

7. A steering system as defined in claim 1 wherein relative rotation between said first and second valve members moves a pivot axis of said rocker arm relative to said second valve member, said rocker arm having a first portion against which force is applied by said second valve member to pivot said rocker arm in a first direction about its pivot axis upon movement of the pivot axis of said rocker arm relative to said second valve member, said rocker arm having a second portion which extends transversely to said first portion and against which force urging said rocker to pivot in a second direction about its pivot axis is applied by said means for applying force to said rocker arm.

8. A steering system as defined in claim 1 further including means for decreasing the resistance to relative rotation between said first and second valve members as the speed of the vehicle decreases.

9. A steering system as defined in claim 8 wherein said means for applying force to said rocker arm includes a force transmitting member engageable with said rocker arm and movable relative to said rocker arm in a direction transverse to the pivot axis of said rocker arm and means for applying a first force to said force transmitting member to urge said force transmitting member toward said rocker arm.

10. A steering system as defined in claim 9 further including means for applying a second force to said force transmitting member to urge said force transmitting member away from said rocker arm.

11. A steering system as defined in claim 10 further including means for increasing the second force applied to said force transmitting member as the speed of the vehicle decreases.

12. A steering system as defined in claim 10 wherein said means for applying the second force to said force transmitting member includes surface means defining a chamber which contains fluid under pressure, the fluid pressure in said chamber acting on said force transmitting member to urge said force transmitting member away from said rocker arm.

13. A steering system as defined in claim 12 further including means for increasing the fluid pressure in said chamber as the speed of the vehicle decreases to thereby increase the force urging said force transmitting member away from said rocker arm.

14. A steering system as defined in claim 1 further including means for rendering said means for applying force to said rocker arm ineffective when the speed of the vehicle is below a predetermined speed.

15. A steering system as defined in claim 14 wherein said means for applying force to said rocker arm includes a force transmitting member engageable with said rocker arm and movable relative to said rocker arm in a direction transverse to a pivot axis of said rocker arm and means for applying a first force to said force transmitting member to urge said force transmitting member toward said rocker arm.

16. A steering system as defined in claim 15 wherein said means for rendering said means for applying force to said rocker arm ineffective includes means for applying a second force to said force transmitting member urging said force transmitting member away from said rocker arm.

17. A steering system as defined in claim 16 wherein said means for applying a second force to said force transmitting member includes a second force transmitting member engageable with said first force transmitting member and surface means defining a chamber containing fluid under pressure, the fluid pressure in said chamber acting against a portion of said second force transmitting member to urge said second force transmitting member toward said first force transmitting member and to effect movement of said first force transmitting member away from said rocker arm.

18. A steering system as defined in claim 14 wherein said means for rendering said means for applying force to said rocker arm ineffective includes a pump for supplying fluid pressure to a chamber in said means for rendering said means for applying force to said rocker arm ineffective when the speed of the vehicle is above the predetermined speed and means for rendering said pump ineffective to supply fluid pressure to said chamber when the speed of the vehicle exceeds the predetermined speed.

19. A steering system as defined in claim 1 wherein said means for applying force to said rocker arm includes means for varying a location where force is applied to said rocker arm as relative angular positions of said first and second valve members change during relative rotation between said valve members.

20. A steering system as defined in claim 1 wherein said means for applying force to said rocker arm includes a force transmitting member, said force transmitting member including surface means engageable with surface means on said rocker arm, said force transmitting member being movable relative to said rocker arm in a direction transverse to a pivot axis of said rocker arm, said surface means on said force transmitting member and said rocker arm having contours that change a point of engagement of said force transmitting member with said rocker arm during relative rotation between said first and second valve members.

21. A steering system as defined in claim 20 wherein said surface means on said rocker arm has a contour that varies the point of engagement of said force transmitting member with said rocker arm as relative angular positions of said first and second valve members change during relative rotation between said first and second valve members.

22. A steering system as defined in claim 1 wherein said rocker arm includes a central portion which is pivotally connected with said first valve member, a first portion which extends in a first direction from said central portion and cooperates with said second valve member, a second portion which is adjacent to said means for applying force to said rocker arm and which extends from the central portion in a second direction which is transverse to the first direction and a third portion which is adjacent said means for applying force to said rocker arm and which extends from the central portion in a third direction which is transverse to the first direction, said rocker arm being pivotal relative to said first valve member under the influence of force applied to said first portion of said rocker arm upon relative rotation between said first and second valve members in one direction to press said second portion of said rocker arm against said means for applying force to said rocker arm and to move said third portion of said rocker arm away from said means for applying force to said rocker arm, said rocker arm being pivotal relative to said first valve member under the influence of force applied to said first portion of said rocker arm upon relative rotation between said first and second valve members in another direction opposite to the one direction of relative rotation between said valve members to press said third portion of said rocker arm against said means for applying force to said rocker arm and to move said second portion of said rocker arm away from said means for applying force to said rocker arm.

23. An apparatus as set forth in claim 22 further including pin means extending outwardly from said first valve member to said central portion of said rocker arm and bearing means disposed between said pin means and said central portion of said rocker arm to support said rocker arm for pivotal movement relative to said pin means.

24. An apparatus as set forth in claim 22 wherein said second valve member includes surface means for defining a recess in said second valve member, said first portion of said rocker arm extending into said recess, said surface means being effective to apply force against a first side of said first portion of said rocker arm upon relative rotation between said first and second valve members in the one direction, said surface means being effective to apply force against a second side of said first portion of said rocker arm upon relative rotation between said first and second valve members in the other direction.

25. A steering system as defined in claim 1 wherein said second valve member includes surface means for defining an elongated chamber having a longitudinal axis extending parallel to and offset from an axis about which said first and second valve members rotate relative to each other, said steering system further including an elongated piston at least partially disposed in said elongated chamber in said second valve member, and means for transmitting fluid pressure to one end portion of said chamber to urge said piston toward said means for applying force to said rocker arm.

26. A steering system for a vehicle, said steering system comprising:

first and second valve members which are rotatable relative to each other to port fluid to a vehicle power steering motor;

force transmitting means for resisting relative rotation between said first and second valve members; and speed responsive means for varying the resistance provided by said force transmitting means to relative movement between said first and second members, said speed responsive means including;

a plurality of pistons disposed in chambers formed in said second valve member, said chambers and pistons having central axes which extend parallel to and are spaced from an axis about which said first and second valve members rotate relative to each other; and means for transmitting to said chambers a fluid pressure which varies as a function of vehicle speed to urge said pistons toward said force transmitting means with a force which varies as a function of vehicle speed.

27. A steering system as set forth in claim 26 wherein said force transmitting means includes a plurality of pivotal members connected with and pivotal relative to said first valve member, said pivotal members being pivoted by said second valve member upon relative rotation between said first and second valve members, and means for applying force to said pivotal members to resist pivoting of said pivotal members by said second valve members, said pistons having end portions which apply force to said means for applying force to said pivotal members to reduce force applied to the pivotal members.

28. An apparatus as set forth in claim 26 wherein said force transmitting means includes surface means for defining a plurality of recesses in said second valve member at locations spaced from said chambers in said second valve member, an annular force transmitting member circumscribing said first valve member, and a plurality of force transmitting elements extending into said recesses and disposed in engagement with said annular force transmitting member, said force transmitting elements being effective to transmit force between said second valve member and said annular force transmitting member upon relative rotation between said first and second valve members.

29. An apparatus as set forth in claim 28 wherein said force transmitting means further includes means for urging said annular force transmitting member toward said force transmitting elements, said pistons being effective to transmit force to said annular force transmitting member urging said annular force transmitting member away from aid force transmitting elements.

30. A steering system as defined in claim 26 wherein said force transmitting means includes a plurality of force transmitting elements, each of said force transmitting elements having a central portion, a first portion which extends in a first direction from said central portion and is connected with said second valve member, a second portion which extends from the central portion in a second direction which is transverse to the first direction, and a third portion which extends from the central portion in a third direction which is transverse to the first direction, each of said force transmitting elements being movable in one direction relative to said first valve member under the influence of force applied to said first portion of each of said force transmitting elements upon relative rotation between said first and second valve members in one direction, each of said force transmitting elements being movable in another direction opposite to the one direction of movement under the influence of force applied to said first portion of said rocker arm upon relative rotation between said first and second valve members in another direction opposite to the one direction of relative rotation between said valve members.

31. A steering system as defined in claim 30 wherein the central portion of each of said force transmitting elements is pivotally connected with said first valve member.

32. A steering system for a vehicle, said steering system comprising:

first and second valve members which are rotatable relative to each other;

a plurality of force transmitting elements which are movable relative to said first and second valve members upon relative rotation between said first and second valve members; and means for applying force to said plurality of force transmitting elements to resist movement of said plurality of force transmitting elements and relative rotation between said first and second valve members;

each force transmitting element of said plurality of force transmitting elements including a central portion, a first portion which extends in a first direction from said central portion and is connected with said second valve member, a second portion which extends from the central portion in a second direction which is transverse to the first direction, said second portion being disposed adjacent to said means for applying force to said force transmitting elements, and a third portion which extends from the central portion in a third direction which is transverse to the first direction, said third portion being disposed adjacent to said means for applying force to said force transmitting elements, each of said force transmitting elements being movable relative to said first valve member under the influence of force applied to said first portion of each of said force transmitting elements upon relative rotation between said first and second valve members in one direction to press said second portion of each of said force transmitting elements against said means for applying force to each of said force transmitting elements and to move said third portion of each of said force transmitting elements away from said means for applying force to each of said force transmitting elements, each of said force transmitting elements being movable relative to said first valve member under the influence of force applied to said first portion of each of said force transmitting elements upon relative rotation between said first and second valve members in another direction opposite to the one direction of relative rotation between said valve members to press said third portion of each of said force transmitting elements against said means for applying force to said force transmitting elements and to move said second portion of each of said force transmitting elements away from said means for applying force to said force transmitting elements.

33. A steering system as defined in claim 32 wherein said central portion of each of said force transmitting elements is pivotally connected with said first valve member.

34. A steering system as defined in claim 32 further including speed responsive means for varying the force applied to said plurality of force transmitting elements by said means for applying force to said plurality of force transmitting elements, said speed responsive means including a plurality of pistons disposed in chambers having central axes which extend parallel to and are spaced from an axis about which said first and second valve members rotate relative to each other and means for transmitting to said chambers a fluid pressure which varies as a function of vehicle speed to urge said pistons toward said means for applying force to said plurality of force transmitting elements with a force which varies as a function of vehicle speed.

35. A steering system for a vehicle, said steering system comprising:

valve members including first and second valve members which are rotatable relative to each other to port fluid to a vehicle power steering motor;

a plurality of force transmitting elements connected with said first and second valve members, said force transmitting elements being movable relative to said first and second valve members upon relative rotation between said first and second valve members;

force applicator means for applying force to said force transmitting elements to resist relative rotation between said first and second valve members;

means for supplying fluid to said valve means at a pressure which decreases as vehicle speed increases;

means for conducting fluid from said valve means to the vehicle power steering motor at a pressure which decreases as vehicle speed increases; and means for increasing the force applied to said plurality of force transmitting elements by said force applicator means as the fluid pressure supplied to said valve means decreases and vehicle speed increases to thereby increase resistance to relative rotation between said first and second valve members as vehicle speed increases.

36. A steering system as set forth in claim 35 wherein said force applicator means includes an annular member and means for pressing said annular member against said force transmitting elements, said means for increasing the force applied to said plurality of force transmitting elements by said force applicator means as fluid pressure supplied to said valve means decreases and vehicle speed increases includes chamber means for holding fluid at a pressure which varies with variations in the fluid pressure supplied to said valve means and which is effective to provide force which urges said annular member away from said force transmitting elements.

37. A steering system as set forth in claim 35 wherein said force applicator means includes an annular member and means for pressing said annular member against said force transmitting elements, said means for increasing the force applied to said plurality of force transmitting elements by said force applicator means as fluid pressure supplied to said valve means decreases and vehicle speed increases includes a plurality of pistons which are urged toward said annular member by fluid pressure which varies with variations in the fluid pressure supplied to said valve means.

38. A steering system as set forth in claim 35 wherein said means for increasing the force applied to said plurality of force transmitting elements by said force applicator means as fluid pressure supplied to said valve means decreases and vehicle speed increases includes a plurality of pistons disposed in chambers in said second valve member, said chambers and pistons having central axes which extend parallel to and are spaced from an axis about which said first and second valve members rotate relative to each other.

39. A steering system as set forth in claim 38 wherein said force transmitting elements are pivotally connected to said first valve member and are pivotal relative to said first valve member about axes which extend transversely to the axis about which said first and second valve members rotate.

\* \* \* \* \*